United States Patent [19]
Scott et al.

[11] Patent Number: 5,259,412
[45] Date of Patent: Nov. 9, 1993

[54] FUEL TANK VAPOR RECOVERY CONTROL

[75] Inventors: William A. Scott, Mt. Zion; Gary L. Baumbarger, Decatur, both of Ill.

[73] Assignee: Tillotson, Ltd., Tralee, Ireland

[21] Appl. No.: 965,810

[22] Filed: Oct. 23, 1992

Related U.S. Application Data

[63] Continuation-in-part of Ser. No. 930,735, Aug. 14, 1992.

[51] Int. Cl.$^5$ .............................................. F02M 37/04
[52] U.S. Cl. ................................ 137/588; 123/516; 123/519; 137/510
[58] Field of Search .................... 137/587, 588, 510; 123/510, 516, 518, 519, 520, 521

[56] References Cited

U.S. PATENT DOCUMENTS

| | | |
|---|---|---|
| 2,939,476 | 6/1960 | Absolon . |
| 3,370,577 | 2/1968 | Guetersloh et al. . |
| 3,728,846 | 4/1973 | Nilsson ............................ 123/519 X |
| 3,746,036 | 7/1973 | Du Bois et al. ................. 137/510 X |
| 4,003,358 | 1/1977 | Tatsutomi et al. . |
| 4,456,216 | 6/1984 | Boruta . |
| 4,633,901 | 1/1987 | Brandt et al. . |
| 4,659,346 | 4/1987 | Uranishi et al. ................ 123/519 X |
| 4,813,453 | 3/1989 | Jenkins et al. ....................... 137/588 |
| 4,887,578 | 12/1989 | Woodcock et al. . |
| 4,932,444 | 6/1990 | Micek ............................... 123/519 X |
| 4,966,299 | 10/1990 | Teets et al. . |
| 4,982,715 | 1/1991 | Foster . |
| 5,060,620 | 10/1991 | Oslapas . |
| 5,116,257 | 5/1992 | Sziaga . |

*Primary Examiner*—Stephen M. Hepperle
*Attorney, Agent, or Firm*—Harness, Dickey & Pierce

[57] ABSTRACT

A fuel supply system for supplying fuel from a fuel source to an internal combustion engine includes a valve assembly having a shut-off valve automatically responsive to negative pressures transmitted from engine aspiration or a fuel pump. The shutoff valve is diaphragm responsive and moves in the same direction as the flow of fuel in order close the valve assembly, thereby retaining the content of a fuel receptacle infinitely. The shutoff valve is adapted to withstand pressures which may develop in a fuel receptacle without opening. In one embodiment, the fuel supply system includes a vapor line for directing fuel vapor from the fuel receptacle to a portion of the engine, where it can be combusted. The vapor line is operatively associated with a fuel cap. The fuel cap can be selectively rotated positioned so as to permit fuel vapor to enter the vapor line.

17 Claims, 5 Drawing Sheets

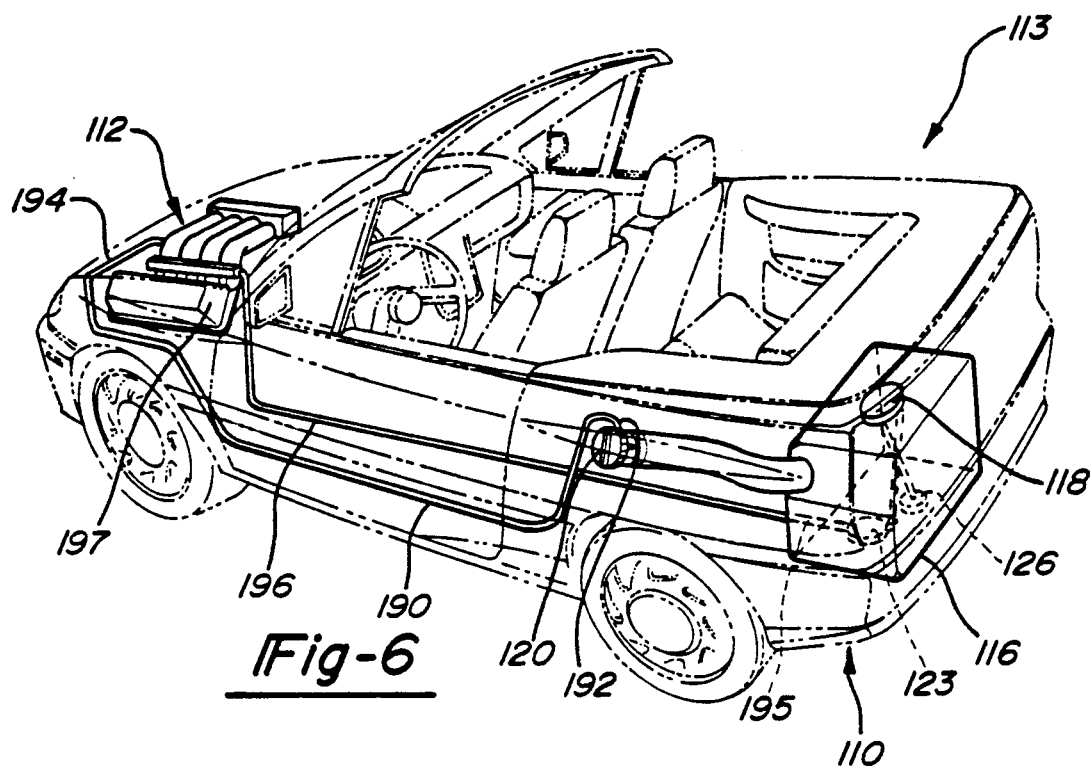
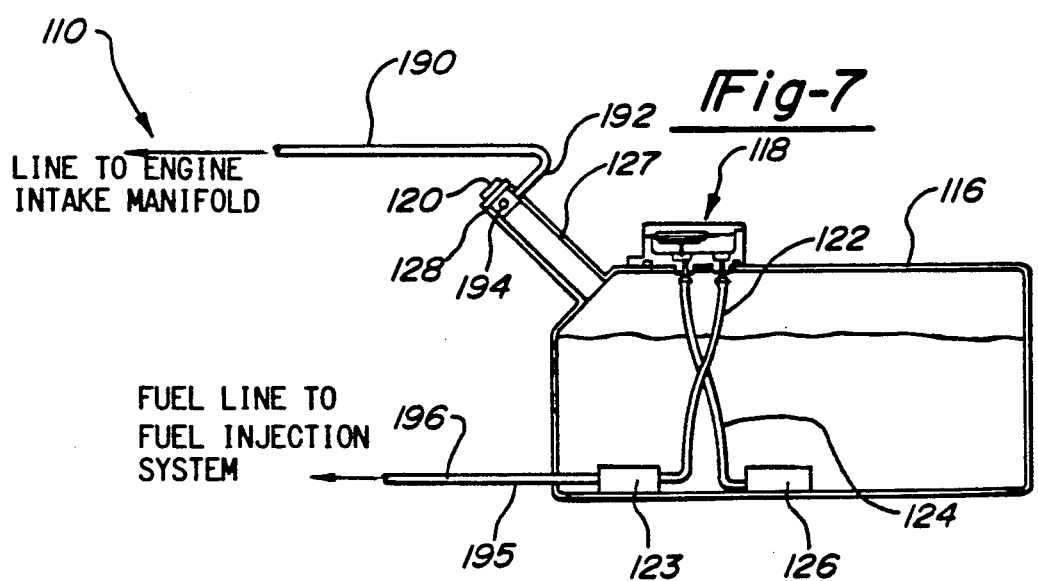

FUEL TANK VAPOR RECOVERY CONTROL

This application is a continuation-in-part of a copending patent application having been assigned Ser. No. 07/930,735 filed Aug. 14, 1992, and entitled Automatic Shutoff Valve.

BACKGROUND AND SUMMARY OF THE INVENTION

The present invention relates generally to a fuel tank vapor recovery control. More particularly, the present invention relates to a valve and fuel tank assembly for controlling fuel vapor from entering the atmosphere during operation or shutdown of a fuel supply system.

Controlling fuel vapor in vehicle fuel tanks has long been an objective for automobile manufacturers and suppliers of fuel system components. Fuel vapor can be created in the fuel tank by fluctuations in ambient temperature, as well as by sloshing and agitation of the fuel during normal fuel operation. The pressure build-up resulting from the creation of new fuel vapors must be properly relieved or contained, otherwise they are released to the atmosphere.

In a typical fuel supply system, such as a fuel supply system associated with internal combustion engines, it is desirable to seal the fuel tank while the engine is shut down, thereby prohibiting harmful vapor as well as inadvertent fuel to escape into the atmosphere. Further, in a typical fuel supply system, it is desirable to route pressurized vapors, which are created due to temperature increases and the like, to the engine for combustion, thereby destroying most of the contaminants before release to the atmosphere.

During appreciable periods of non-use, particularly under high ambient temperature conditions, the volume of fuel in a typical fuel tank is subject to cyclical periods of expansion and contraction during which the fuel vaporizes and condenses. Such a situation would be exemplified by cars parked in long-term parking in regions where the days are hot and the evenings are cool. In typical fuel supply systems, such temperature fluctuations permit vapor to be released into the atmosphere, causing a loss in fuel and contributing to the contamination of the atmosphere.

Emissions problems have long been associated with traditional fuels such as gasoline. Even more of a problem have been alternative fuels such as ethanol, which are known to evaporate at a rate greater than gasoline.

In order to prohibit vapor and fuel from egressing from the fuel receptacle while not in use, many techniques have previously been employed. For example, in the most simple mechanical scenario, a valve can easily be incorporated which can be manually closed. While this technique is effective, it is inherently associated with numerous drawbacks including, but not limited to, operator error or forgetfulness and inconvenience, especially where the fuel source is remotely located relative to the engine controls.

It has also been previously proposed to provide a valve for a fuel receptacle which is responsive above a predetermined negative pressure or vacuum on the engine side of the valve. However, such valves heretofore incorporated can be opened by a positive pressure equal in magnitude located on the fuel receptacle side of the valve. This makes the tank susceptible to pop-off or breakaway when the receptacle contents exceeds a given pressure, and thereby allows fuel and vapor to be released into the atmosphere.

It is also known that charcoal filled canisters can be utilized to partially control the emission of fuel vapors. Such systems typically consist of a canister containing carbon or other medium which will releasably adsorb the fuel vapors. The canister includes an inlet from the fuel tank or other reservoir through which fuel vapors flow either by gravity or under vapor pressure into the canister to be adsorbed by the filter medium therein and stored. Typical canisters additionally include an atmospheric vent, and a purge line connecting the canister to the carburetor or engine intake manifold. During operation of the engine, vacuum in the intake manifold draws fresh air through the canister to the engine, thereby desorbing the filter medium of the fuel vapors.

The vapor adsorbing capacity of such an adsorbent bed is necessarily limited. Otherwise stated, a size prohibitive adsorbative bed is necessary to eliminate or at least substantially eliminate the fuel vapors which are admitted to the atmosphere, e.g., when the vehicle remains unused for long periods and/or is used in an area of high ambient temperatures. The "packaging" of a large capacity fuel vapor emission control canisters in motor vehicles, that is, the positioning of one or more such canisters within a vehicle, presents a significant problem to the vehicle manufacturers, especially in view of the ever-increasing importance of vehicle space to accommodate vehicle down-sizing.

Accordingly, it is desired to provide a valve design which overcomes the above-discussed problems inherently associated with the prior art by providing an improved valve for fuel supply systems that automatically opens in response to negative pressure on the engine side of the valve, but will not open in response to positive pressure produced on the fuel receptacle side of the valve. The present invention provides such a valve for use in supplying fuel from a fuel source to an internal combustion engine.

Thus, it is a principal object of the present invention to provide an assembly for a fuel supply system which is responsive to negative pressure produced by the engine or a fuel pump, but which is resistant to positive pressures which may develop in a fuel receptacle.

It is a related object of the present invention to provide an assembly for a fuel supply system which automatically prohibits vapor from escaping from a fuel receptacle upon engine shutoff.

It is another object of the present invention to provide a fuel supply assembly which vents to atmosphere in one direction during engine operation and seals the fuel and fuel vapor from entering atmosphere during engine operation as well as during engine shut down.

It is a further object of the present invention to provide an assembly through which the fuel flows in the same direction as the valve moves to shut off flow through the assembly, so that pressure will be contained infinitely.

It is yet a further object of the present invention to provide a fuel supply system suitable for the transmission and utilization of alternative fuel sources, such as ethanol, which has a greater evaporation rate than gasoline, within regulatory requirements.

It is still another object of the present invention to provide a fuel receptacle for having a vapor venting mechanism associated with a fill cap, the vapor venting mechanism being operative to selectively deliver fuel vapor from the receptacle to an engine for combustion.

It is yet a further object of the present invention to provide a fuel supply system adapted to self-contain a source of fuel throughout extended periods cyclical ambient temperature fluctuations.

It is still a further object of the present invention to provide a fuel supply system adapted to combust fuel vapor which would otherwise be released into the atmosphere upon refilling of a tank associated with the fuel supply system.

It is still yet a further object of the present invention to provide a sealable, reinforced fuel tank capable of withstanding internal pressures resultant from ambient temperature fluctuations.

From the subsequent detailed description taken in conjunction with the accompanying drawings and subjoined claims, other objects and advantages of the present invention will become apparent to those skilled in the art.

The present invention, in a first form thereof, provides an assembly for a fuel supply system which includes a housing defining a cavity, an inlet in communication with the cavity, and valve means for controlling fuel flow through the inlet. The valve means is movable in a first direction to allow fuel to flow through the inlet, and in a second direction to prohibit fuel from flowing through the inlet. The second direction is toward the inlet.

The present invention, in a second form thereof, provides a fuel receptacle for storing liquid fuel therein prior to delivery to an internal combustion engine. The fuel receptacle includes a main housing defining a cavity, a fill neck in communication with the cavity, a cap member detachably connected to a first end of the fill neck, and vapor vent means operatively associated with the cap member for selectively delivering fuel vapor from the cavity to a portion of the engine. The cap member threadably engages the fill neck and is formed to include an aperture adapted to align with a vapor vent line upon approximately one quarter counterclockwise rotation of the cap member.

BRIEF DESCRIPTION OF THE DRAWINGS

Other objects and advantages of the present invention will become more apparent to those skilled in the art from the following detailed description of the preferred embodiment and from the attached drawings in which:

FIG. 6 illustrates a front perspective view of a system constructed in accordance with the teachings of a second embodiment of the present invention shown in operative association with an automobile;

FIG. 7 is a partial cross-sectional view of the system of FIG. 6 taken through the line 7—7 of FIG. 6;

DETAILED DESCRIPTION OF THE PREFERRED EMBODIMENTS

Figure 1:
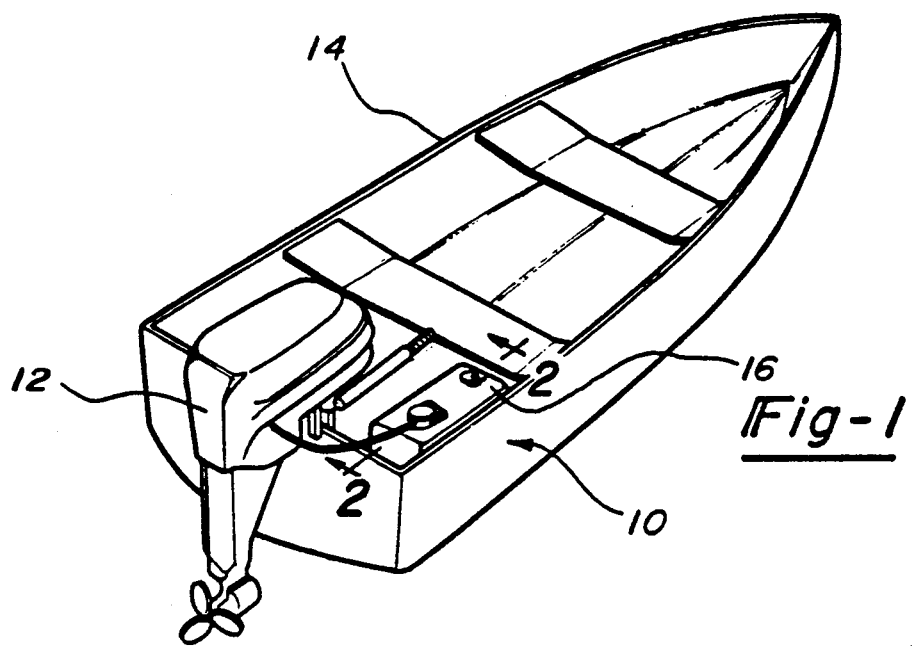
FIG. 1 illustrates a front perspective view of an assembly and system constructed in accordance with the teachings of a first embodiment of the present invention shown in operative association with a conventional outboard motor.

As generally shown in FIG. 1, a first preferred embodiment of the fuel supply system 10 of the present invention is shown in operative association with an outboard motor 12. It will be appreciated by those skilled in the art that the illustrated use is merely exemplary and the teachings of the present invention are equally applicable to fuel systems for fuel tanks mountable on garden tractors, riding lawnmowers, or any like gasoline powered device which typically uses an atmospheric vent fuel tank.

Figure 2:
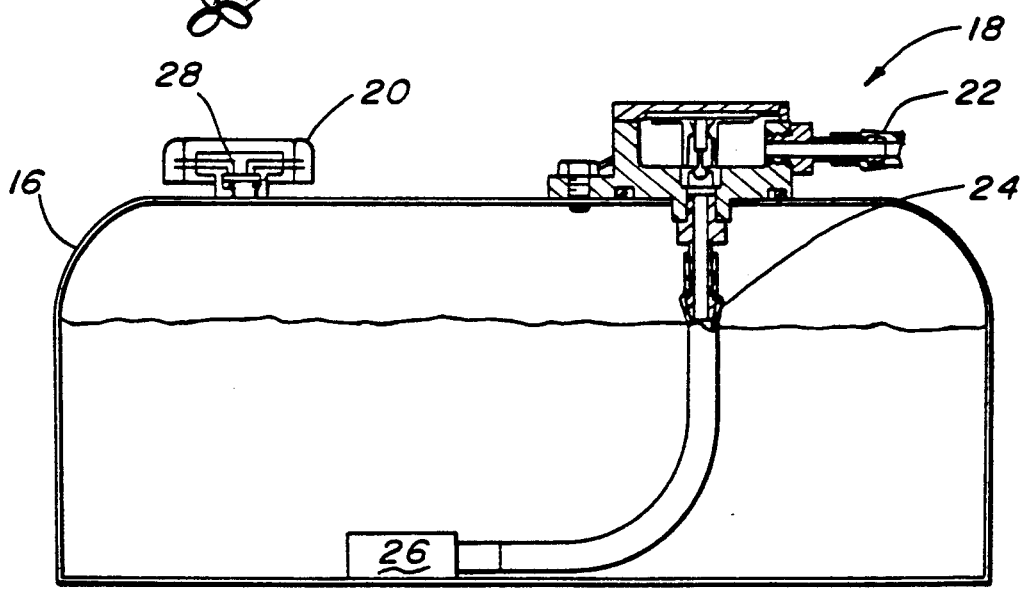
FIG. 2 is a partial cross-sectional view of the assembly and system of FIG. 1 taken through the line 2—2 of FIG. 1.

Referring to FIGS. 1 and 2, the fuel supply system 10 of the present invention is shown operatively connected to an outboard motor 12 of a boat 14. The fuel supply system 10 comprises a fuel receptacle 16, a valve assembly 18 and a removable cap 20. The valve assembly 18 is attached to a first conduit 22 which provides fluid communication between the valve assembly 18 and the motor 12. The valve assembly 18 is additionally attached to a second conduit 24 which serves to fluidly communicate the valve assembly 18 with a fuel filter 26 located at the bottom of the fuel receptacle 16. As will become more apparent below, the valve assembly 18 is adapted to be automatically responsive to negative pressures or vacuum produced by the motor 12 and transmitted through the first conduit 22. The valve assembly 18 is further adapted to remain closed despite the build-up of positive pressures in the fuel receptacle 16 which may be transferred through the second conduit 24.

The cap 20 of the fuel supply system 10 of the first embodiment of the present invention is removable, thereby providing access to fill the receptacle 16. The cap 20 includes a positive shutoff check valve 28 which permits air to enter the receptacle 16 through the cap 20 in order to replace fuel which is removed during operation of the motor 12. The positive shutoff check valve 28 prohibits fuel or vapor from exiting the fuel receptacle 16 via the cap 20, thereby retaining content within the receptacle 16 infinitely.

Figure 3:
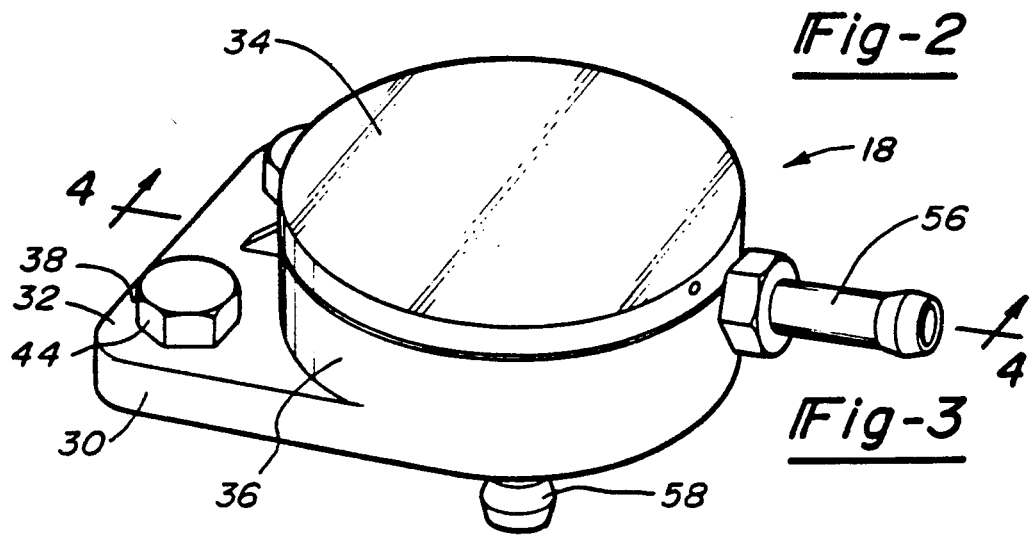
FIG. 3 is a perspective front view of the assembly of FIG. 1.
Figure 4:
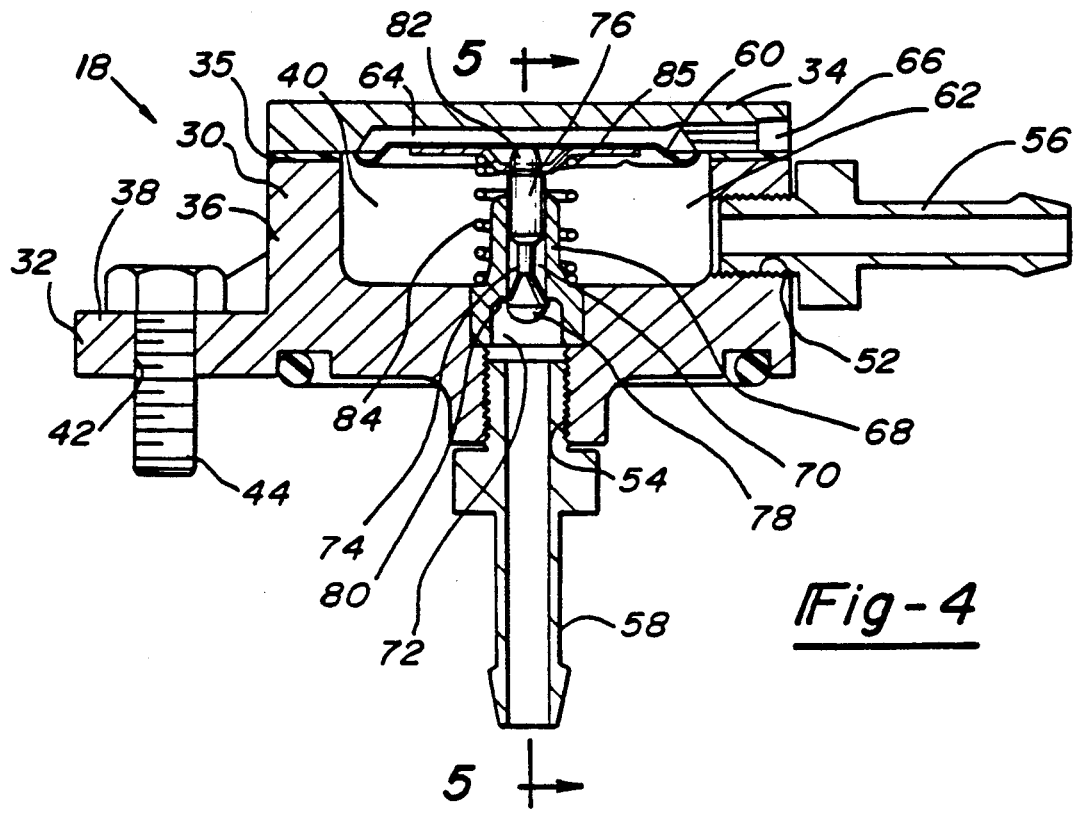
FIG. 4 is a cross-sectional view taken through the line 4—4 of FIG. 3 illustrating the valve in its closed position.
Figure 5:
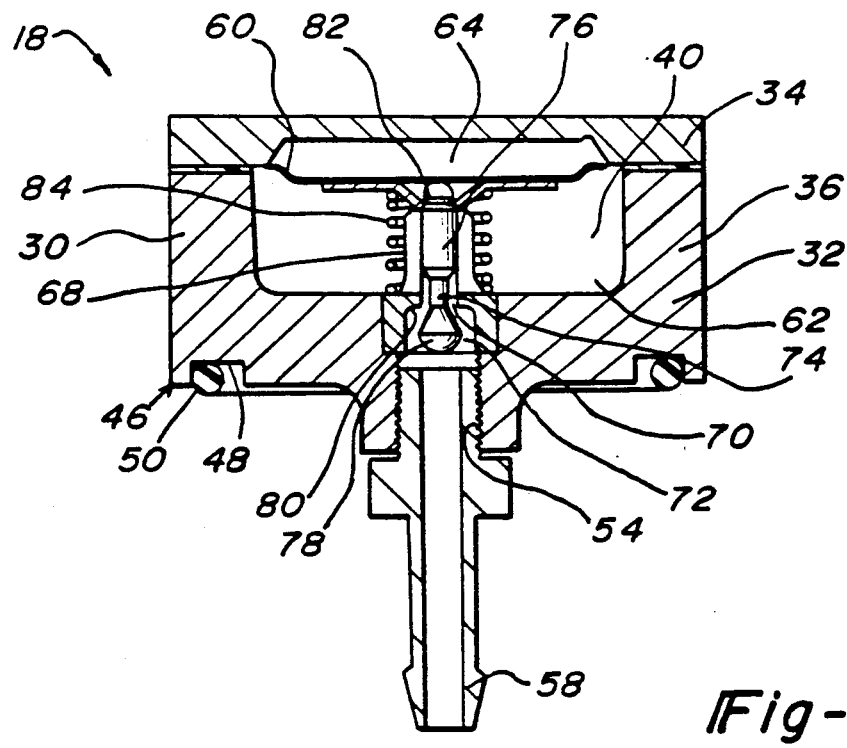
FIG. 5 is a cross-sectional view taken through the line 5—5 of FIG. 4 illustrating the valve in its open position.

Turning next to FIGS. 3-5, the valve assembly 18 of the present invention will be described in greater detail. The valve assembly 18 comprises a valve body 30 which is of a two-piece construction having a first, or base portion 32 and a second, or cap portion 34. In the first preferred embodiment, the base portion 32 and cap portion 34 of the valve body 30 are molded of a plastic material and are suitably joined together with fastening means such as adhesive or bolts (not shown). Construction of the base and cap portions 32, 34 from molded plastic allows for manufacturing without machining, thereby considerably decreasing the forming operations and also decreasing the production costs associated with the valve assembly 18.

The first or base portion 32 of the valve body 30 includes an upwardly extending cylindrical wall portion 36 and a flange portion 38. The upwardly extending cylindrical wall portion 36 defines a body cavity 40 which will be described in further detail below. The flange portion 38 is integrally formed with the cylindrical wall portion 36 to axially extend from the lower part of the cylindrical wall portion 36. The flanged portion 38 is formed to include apertures 42 adapted to receive mounting bolts 44 used to affix the valve assembly 18 to the fuel receptacle 16. The valve assembly 18 further Comprises an underside 46 which is formed to include a circular recess 48 adapted to receive an O-ring seal 50.

In the first preferred embodiment, the valve assembly 18 is further formed to include first and second threaded apertures 52, 54 adapted to engageably receive an outlet fitting 56 and an inlet fitting 58, respectively. It will be appreciated by those skilled in the art that the outlet fitting 56 and inlet fitting 58 may alternatively be pressure fit or integrally formed with the valve body 30.

A diaphragm 60 is peripherally captured between the base and cap portions 32, 34 of the valve body 30, to thereby define a metering chamber 62 below the diaphragm 60, and an atmospheric chamber 64 above the diaphragm 60. The atmospheric chamber 64 is held at atmospheric pressure through exposure to the atmosphere through an aperture 66 in the cap portion 34 of the valve body 30, thereby facilitating movement of the diaphragm 60 in response to reduced pressures which, as discussed below, are transmitted to the metering chamber 62.

In the first preferred embodiment, a semi-cylindrical hollow guide portion 68 is disposed substantially adjacent the inlet fitting 58 and extends upwardly into the metering chamber 62 of the body cavity 60. The guide portion 68 partially defines a channel 70 with an enlarged lower end 72 and a narrower upper end 74. Disposed within the guide portion 70 is an elongated shutoff valve 76. The shutoff valve 76 includes an enlarged head 78 adapted to seat on a valve seat 80 disposed between the upper and lower portions 72, 74 of the channel 70.

The elongated shutoff valve 76 is articulately connected at a first or upper end 82 to the diaphragm 60. An expansive coil spring 84 surrounds the guide portion 68 and extends the vertical length of the metering chamber 62 with a first end 85 disposed adjacent the diaphragm 60, thereby biasing the diaphragm upward and resultantly biasing the shutoff valve 76 to its closed position (as shown in FIG. 4).

When negative pressure is present in the outlet fitting 56 as will be discussed fully hereinafter, and is communicated to the metering chamber 62 of the valve body 30, the diaphragm 60 is flexed downwardly, overcoming the force from the spring 84 and displacing the enlarged portion 7 of the shutoff valve 76 from a closed position (as shown in FIG. 4). The negative pressure then causes fuel to be drawn through the inlet fitting 58 into the metering chamber 62, and through the outlet fitting 56.

The operation of the fuel supply assembly 10 of the first preferred embodiment of the present invention as herein described is as follows.

As a gasoline powered motor 12 which is operatively associated with the fuel supply system 10 of the present invention is started, or continues to run, negative pressure or vacuum is produced which is transmitted through the first conduit 22 to the outlet fitting 56 and eventually to the metering chamber 62 of the body cavity 40. This vacuum flexes the diaphragm 60 downwardly causing the shutoff valve 76 to similarly translate downwardly, thereby Opening the valve assembly 18 (as shown in FIG. 5). Fuel flow is correspondingly drawn through the inlet fitting 58 by the vacuum. As fuel is drawn through the valve assembly 18, the volume inside the fuel receptacle 16 is allowed to remain constant since the positive shutoff check valve 28 of the cap 20 allows air to be drawn into the fuel receptacle 16.

After the motor 12 is shut down, the vacuum ceases and the shutoff valve return spring 84 forces the diaphragm 60 upwardly, thereby drawing the elongated shutoff valve 76 upward to its closed position (FIG. 4). Since fuel flows through the assembly 18 in the same direction as the shutoff valve 76 moves to close the valve assembly 18, pressures will be contained infinitely, thereby controlling fuel evaporate emission to atmosphere to a more positive degree. The direction of the motion of the shutoff valve 76 is further significant since it enables the valve assembly 18 to withstand pressures which may develop in the fuel receptacle 16 without opening the valve assembly 18.

Referring now to FIGS. 6 through 10, a second preferred embodiment of the fuel supply system 110 of the present invention is illustrated in operative association with an engine 112 of a vehicle 113. Elements common to the embodiment of FIGS. 1 through 5 are designated with reference numerals increased by 100.

Again, it will be appreciated by those skilled in the art that the illustrated use is merely exemplary and that the teachings of the present invention are equally applicable to fuel supply systems for garden tractors, garden lawnmowers, or any like gasoline powered device, particularly those incorporating a fuel pump.

Referring to FIGS. 6 and 7, the fuel supply system 110 of the present invention is shown operatively connected with an engine 112 of a vehicle 113. The fuel supply system 110 comprises a fuel tank or receptacle 116, a valve assembly 118, and a removable fill ca 120. The valve assembly 118 is attached to a first conduit 122 which provides fluid communication between the valve assembly 118 and a fuel pump 123. The valve assembly 118 is additionally attached to a second conduit 124 which serves to fluidly communicate the valve assembly 118 with a fuel filter 126 located at the bottom of the fuel receptacle 116. As will become more apparent below, the valve assembly 118 is adapted to be automatically responsive to negative pressures or vacuum produced by the fuel pump 123 and transmitted through the first conduit 122. The valve assembly 118 is further adapted to remain closed despite the build-up of positive pressures in the fuel receptacle 116 which may be transferred through the second conduit 124.

The receptacle 116 of the second embodiment of the present invention is shaped substantially identical to a conventional fuel receptacle. In this regard, the receptacle 116 includes a fill neck 127 which communicates with the interior of the fuel receptacle 116. Differing from conventional fuel tanks, the fuel receptacle 116 of the second embodiment of the present invention is designed to be able to withstand a greater degree of internal pressure. To this end, any seams (not shown) in the receptacle 116 are reinforced. In the preferred embodiment, the fuel receptacle 116 is constructed of metal. Alternatively, the fuel receptacle 116 could be formed with light-weight plastics.

Preferably, the cap member 120 threadably engages a first end 128 of the neck 127 of the fuel receptacle 116. Vapor vent means is provided by a vapor line 190 having a first end 192 in communication with the fill neck 127. A second end 194 of the vapor line 190 is in communication with the intake manifold (not shown) of the engine 112. A check valve (not shown) may be incorporated into the vapor line 190.

Means for selectively permitting fuel vapor to enter the vapor line 190 is provided by an aperture 194 radially disposed in the cap member 120. The aperture 194 is positioned so as to align with the first end 192 of the vapor line 190 upon approximately one-fourth counterclockwise rotation of the cap member 120.

The fuel pump 123 is additionally in communication with the first end 195 of a fuel line 196. A second end 197 of the fuel line 196 is in communication with the fuel injection system (not shown) of the engine 112.

Figure 8:
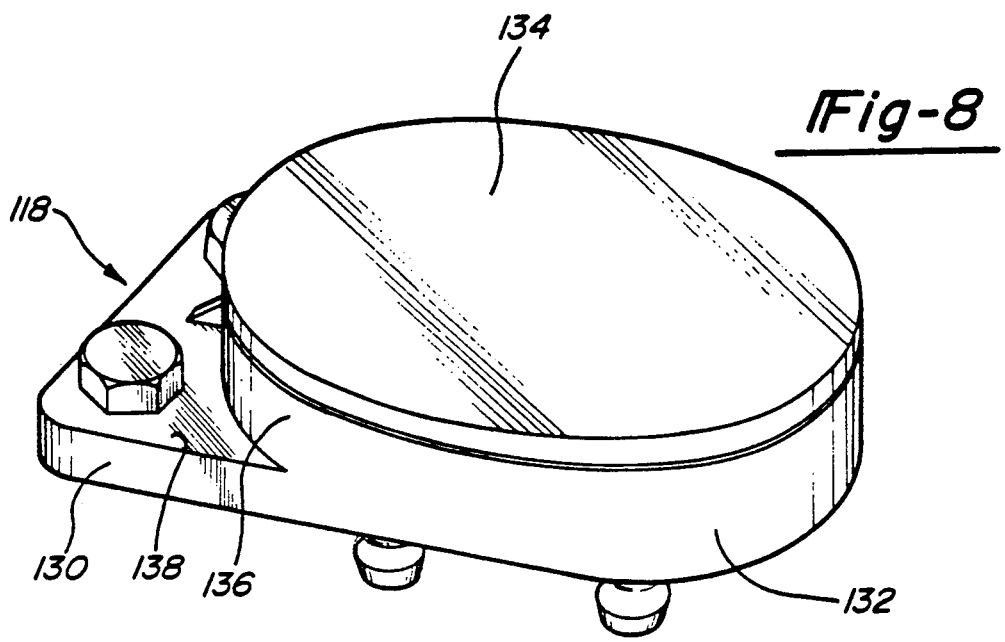
FIG. 8 is a perspective front view of the valve assembly of FIG. 6.
Figure 9:
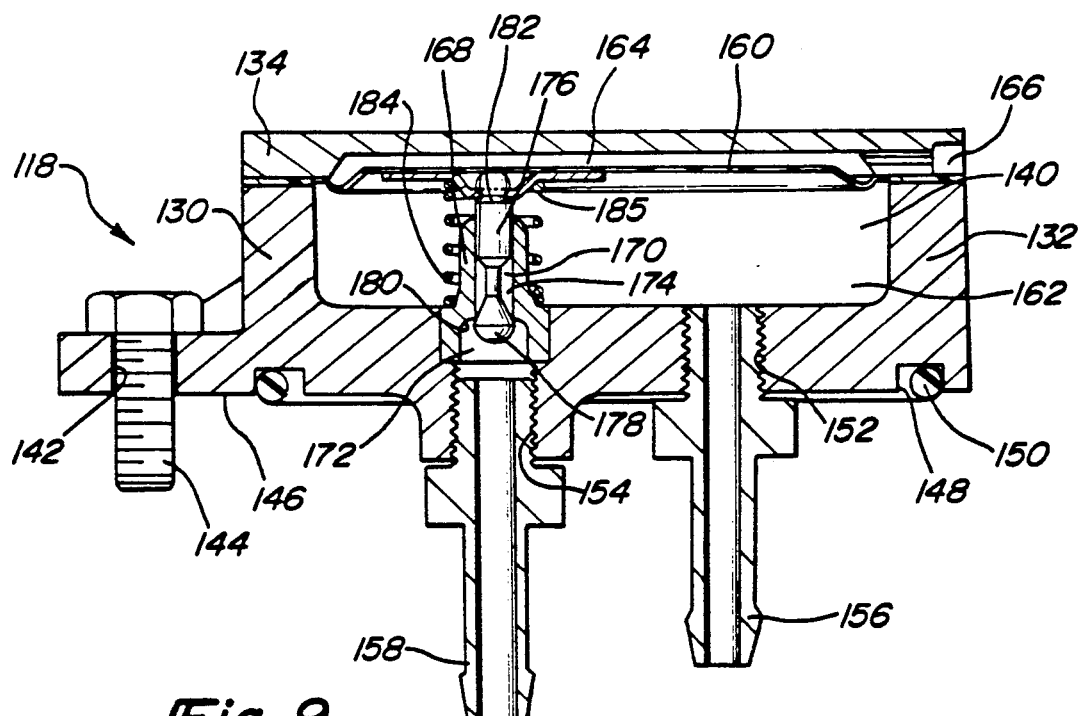
FIG. 9 is a cross-sectional view taken through the line 9—9 of FIG. 8 illustrating the valve in its closed position.
Figure 10:
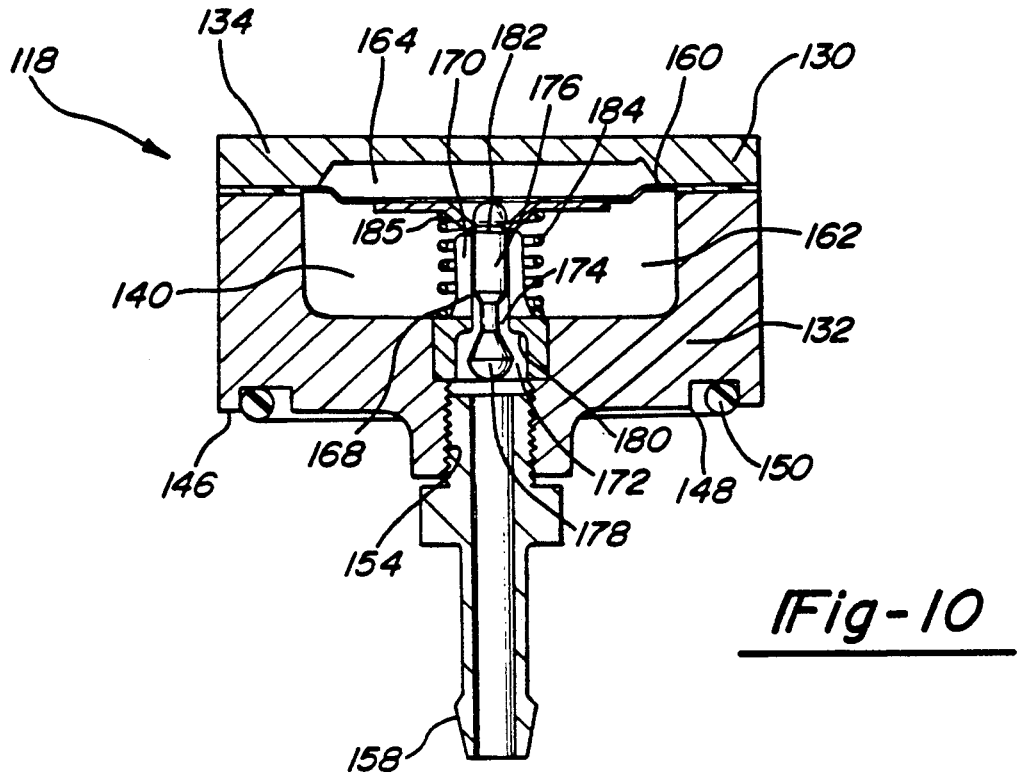
FIG. 10 is a cross-sectional view taken through the line 10—10 of FIG. 9 illustrating the valve moved to its open position.

Turning next to FIGS. 8 through 10, the valve assembly 118 of the second preferred embodiment of the present invention will be described in detail. The valve assembly 118 comprises a valve body 130 which is of a two-piece construction having a first, or base portion 132 and a second, or cap portion 134. As with the first preferred embodiment, the base portion 132 and cap portion 134 of the second preferred embodiment of the valve body 130 are molded of a plastic material and are suitably joined together with fastening means such adhesive or bolts (not shown). Construction of the base and cap portions 132, 134 from molded plastic allows for manufacturing without machining, thereby considerably decreasing the forming operations and also decreasing the production cost associated with the valve assembly 118.

The base portion 132 of the valve body 130 includes an upwardly extending wall portion 136 and a flange portion 138. The upwardly extending wall portion 13 is oval in cross-section and defines a body cavity 140 which will be described in further detail below. The flange portion 138 is integrally formed with the wall portion 136 to axially extend from the lower part of the wall portion 136. The flange portion 138 is formed to include apertures 142 adapted to receive mounting bolts 144 used to affix the valve assembly 118 to the fuel receptacle 116. The valve assembly 118 further comprises an underside 146 which is formed to include a substantially oval recess 148 adapted to receive an O-ring seal 150.

In the second preferred embodiment, the valve assembly 118 is further formed to include first and second threaded apertures 152, 154 adapted to engageably receive an outlet fitting 156 and an inlet fitting 158, respectively. It will be appreciated by those skilled in the art that the outlet fitting 156 and the inlet fitting 158 may alternatively be pressure fit or integrally formed with the valve body 130.

A diaphragm 160 is peripherally captured between the base and cap portions 132, 134 of the valve body 130, thereby defining a metering chamber 162 below the diaphragm 160, and an atmospheric chamber 164 above the diaphragm 160. The atmospheric chamber 164 is held at atmosphere pressure through exposure to the atmosphere through an aperture 166 in the cap portion 134 of the valve body 130, thereby facilitating movement of the diaphragm 160 in response to reduced pressures which, as discussed below, are transmitted to the metering chamber 162.

In the second preferred embodiment, a semi-cylindrical hollow guide portion 168 is disposed substantially adjacent the inlet fitting 158 and extends upwardly into the metering chamber 162 of the body cavity 160. The guide portion 168 partially defines a channel 170 with an enlarged lower end 172 and a narrower upper end 174. Disposed within the guide portion 170 is an elongated shutoff valve 176. The shutoff valve 176 includes an enlarged head 178 adapted to seat on a valve seat 180 disposed between the upper and lower portions 172, 174 of the channel 170.

The elongated shutoff valve 176 is articulately connected at a first or upper end 182 to the diaphragm 160. An expansive coil spring 184 surrounds the guide portion 168 and extends substantially the vertical length of the metering chamber 162 with a first end 185 disposed adjacent the diaphragm 160, thereby biasing the diaphragm upwardly and resultantly biasing the shutoff valve 176 to its closed position (as shown in FIG. 9).

When negative pressure is produced by the fuel pump 123 is transmitted to the outlet fitting 156, and is communicated to the metering chamber 162 of the valve body 130, the diaphragm 160 is flexed downwardly, overcoming the force of the spring 184 and displacing the enlarged portion 178 of the shutoff valve 176 from a closed position to an open position (as shown in FIG. 10). The negative pressure subsequently causes fuel to be drawn through the inlet fitting 158 into the metering chamber 162, and through the outlet fitting 156.

The operation of the fuel supply assembly 110 of the second preferred embodiment of the present invention as herein described is as follows. As a gasoline powered engine 112 which is operatively associated with the fuel supply system 110 of the second preferred embodiment is started, or continues to run, negative pressure or vacuum is produced by the fuel pump 123 which is transmitted through the first conduit 122 to the outlet fitting 156 and eventually to the metering chamber 162 of the body cavity 140. This vacuum flexes the diaphragm 160 downwardly causing the shutoff valve 176 to similarly translate downwardly, thereby opening the valve assembly 118 (as shown in FIG. 10). Fuel flow is correspondingly through the inlet fitting 158 by the vacuum, and delivered to the engine 112.

After the engine 112 is shut down, the vacuum ceases and the shutoff valve return spring 184 forces the diaphragm 160 upwardly, thereby drawing the elongated shutoff valve 176 upward to its closed position (FIG. 9). Since fuel flows through the assembly 118 in the same direction as the shutoff valve 176 moves to close the valve assembly 118, pressures will be contained infinitely, thereby controlling fuel evaporate emission to the atmosphere to a more positive degree. The direction of the motion of the shutoff valve 176 is further significant since it enables the valve assembly 118 to withstand pressures which may develop in the fuel receptacle 116 without opening the valve assembly 118.

Thus, when the engine 112 is shut down, the fuel contained in the fuel receptacle 116 is completely contained, thereby substantially eliminating evaporative emissions to the atmosphere. During appreciable periods of non-use, particularly under high ambient temperature conditions or cyclical temperature conditions, the volume of fuel in the fuel tank 116 is subject to cyclical periods of expansion and contraction during which the fuel vaporizes and condenses. As discussed above, the fuel receptacle 116 of the present invention is constructed so as to be capable of withstanding such internal pressures.

Upon refueling, excessive internal pressure in the form of fuel vapor in the fuel receptacle 116 is routed to the intake manifold of the engine 112 where it can be combusted prior to emission to the atmosphere. In this regard, prior to refilling, one quarter counter-clockwise rotation of the cap member 120 causes the aperture 194 in the cap member 120 to align and cooperate with the first end 192 of the vapor vent line 190. This rotation allows the excess pressure in the form of fuel vapor to be routed to the intake manifold of the engine 112 where it is contained by valves (not shown) prior to combustion. After refueling, the fuel vapor delivered to the intake manifold is combusted prior to its release to the atmosphere.

Figure 11:
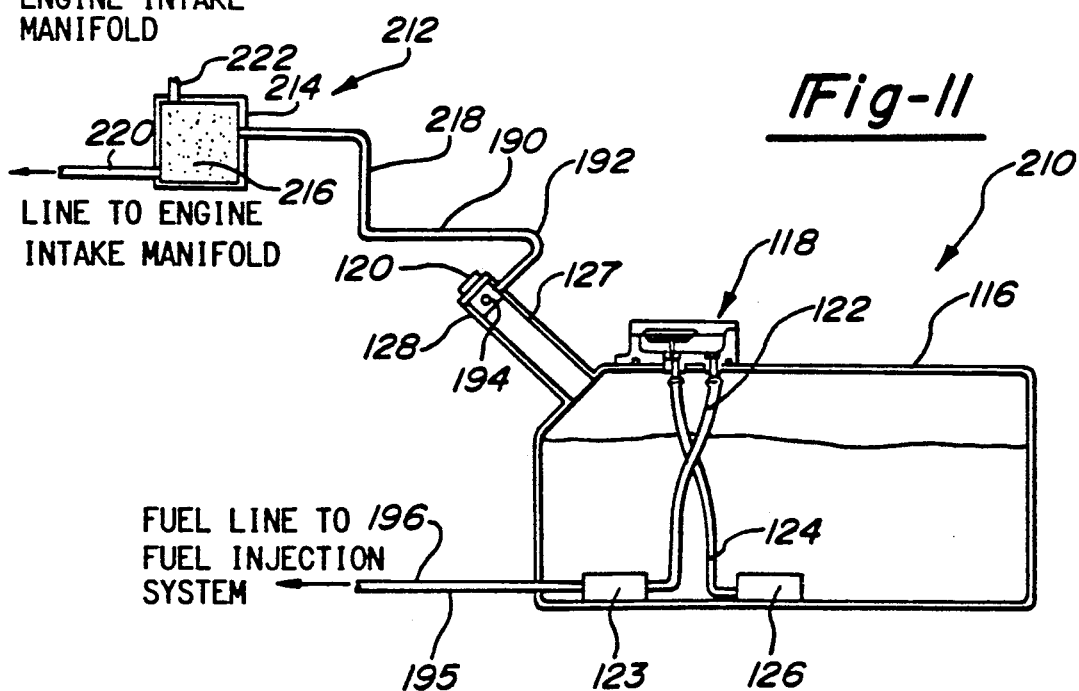
FIG. 11 is an alternative embodiment of the system of FIG. 7, incorporating a charcoal canister.

Referring now to FIG. 11, an alternative fuel supply system 210 is illustrated. The alternative fuel supply system 210 is substantially identical to the second preferred embodiment of the fuel supply system 110 with the addition of a purge system 212. For this reason, in FIG. 11, elements common to the embodiments of FIGS. 6 through 10 are designated with like reference numerals.

The purge system 212 includes adsorption means which is provided by a canister 214 containing carbon or other medium which will adsorb fuel vapors. Preferably, the canister contains a bed of charcoal 216. The canister is in communication with the vent line 190 by way of a first purge line 218. A second purge line 220 communicates the canister 214 with the intake manifold (not shown) of the engine 112. The canister 214 further includes an atmospheric vent 222.

The operation of the alternative fuel supply assembly 210 is substantially identical to that of the second preferred embodiment of the fuel supply system 110 with the additional functioning of the purge system 212. In this regard, as the cap member 120 is turned one-quarter turn counter-clockwise prior to refueling, fuel vapor is routed through the vent line 192 to the engine intake manifold. During the most extreme of conditions, the capacity of fuel vapor present in the fuel receptacle 116 may overcome the capacity of the vent line 190 and engine intake manifold. To overcome this potential shortcoming, the purge system 212 provides a safety overflow to catch fuel vapor which would otherwise be lost to the atmosphere through the fill neck 127. That is, once the vent line 190 and engine intake manifold reach capacity, fuel vapor is allowed to pass through the first purge line 218 into the canister 214 where it can be adsorbed by the bed of charcoal 216. During operation of the engine 112, a vacuum in the intake manifold (not shown) draws air through the atmospheric vent 222 to thereby desorb the bed of charcoal 216 of fuel vapors. The fuel vapors are then transmitted through the second purge line 220 to the intake manifold (not shown) where they can be combusted.

While it will be apparent to those skilled in the art that the preferred embodiment is well calculated to fulfill the above-stated objects, it will also be appreciated that the present invention is susceptible to modification, variation and alteration without departing from the scope and spirit of the claims as set forth below.

What is claimed is:

1. A fuel system for storing liquid fuel therein prior to delivery to an internal combustion engine, said fuel system comprising:
   a main housing defining a cavity;
   a fill neck in communication with said cavity;
   a cap member detachably connected to a first end of said fill neck; and
   vapor vent means for selectively permitting fuel vapor to enter said vapor line;
   wherein said means for selectively permitting fuel vapor to enter said vapor line comprises an aperture radially disposed in said cap member.

2. The fuel receptacle of claim 1, wherein said aperture is positioned so as to align with said first end of said vapor line upon rotation of said cap member.

3. The fuel receptacle of claim 1, wherein said aperture is positioned so as to align with said first end of said vapor line upon approximately ¼counterclockwise rotation of said cap member.

4. The fuel receptacle of claim 1, further comprising a valve member attached to said fuel receptacle, said valve member including a housing defining a cavity, said cavity being in fluid communication with a fuel outlet and a fuel inlet, control means disposed in said cavity responsive to reduced pressures transmitted to said cavity to open said valve, and a seating means disposed in said cavity for preventing said valve member from opening in response to positive pressure in said fuel receptacle.

5. The fuel receptacle of claim 4, wherein said outlet is in communication with said fuel pump.

6. The fuel receptacle of claim 1, wherein said vapor vent means further comprises adsorption means for releasably adsorbing fuel vapors disposed along said vapor line.

7. The fuel receptacle of claim 6, wherein said adsorption means comprises a bed of charcoal.

8. A system for supplying fuel to an engine having a carburetor and an intake manifold, and for substantially eliminating fuel vapor emission to the atmosphere, the system comprising:
   a fuel receptacle for storing liquid fuel therein, said fuel receptacle having a neck;
   a vapor line having a first end communication with said neck;
   a cap member detachably connected to said fuel receptacle, said cap member including means for selectively permitting fuel vapor to enter said vapor line;
   a valve member attached to said fuel receptacle, said valve member including a housing defining a cavity, said cavity being in fluid communication with a fuel outlet and a fuel inlet, control means disposed in said cavity responsive to reduced pressures transmitted to said cavity to open said valve, and a seating means disposed in said cavity for preventing said valve member from opening in response to positive pressure in said fuel receptacle; and
   a fuel pump in fluid communication with said fuel outlet and said engine;
   wherein said means for selectively permitting fuel vapor to enter said vapor line comprises an aperture radially disposed in said cap member.

9. The system of claim 8, wherein said aperture is positioned so as to align with said first end of said vapor line upon rotation of said cap member.

10. The system of claim 8, wherein said aperture is positioned so as to align with said first end of said vapor line upon approximately counterclockwise rotation of said cap member.

11. The system of claim 10, wherein said vapor vent means further comprises adsorption means for releasably adsorbing fuel vapors disposed along said vapor line.

12. The system of claim 11, wherein said vapor vent means further comprises adsorption means for releasably adsorbing fuel vapors disposed along said vapor line.

13. A system for supplying fuel to an engine and for substantially eliminating emissions of fuel vapor to the atmosphere, the system comprising:
- a fuel receptacle for storing fuel therein, said fuel receptacle having a fill neck portion dependent therefrom;
- a vapor line having a first end in communication with said neck portion;
- a cap member detachably connected to said fuel receptacle, said cap member including means integral with said cap member for selectively permitting fuel vapor to enter said vapor line; and
- a valve member attached to said fuel receptacle including operative means for blocking said fuel inlet when said engine is shut down;

wherein said fuel and said fuel vapor are self-contained in said fuel receptacle when said engine is shut down and said cap is fully engaged with said neck portion.

14. The fuel receptacle of claim 13, wherein said cap member threadably engages said first end of said neck portion.

15. The fuel receptacle of claim 14, wherein said means for selectively permitting fuel vapor to enter said vapor line comprises an aperture radially disposed in said cap member.

16. The fuel receptacle of claim 15, wherein said aperture is positioned so as to align with said first end of said vapor line upon rotation of said cap member.

17. The fuel receptacle of claim 16, wherein said aperture is positioned so as to align with said first end of said vapor line upon approximately $\frac{1}{4}$ counterclockwise rotation of said cap member.

* * * * *